United States Patent [19]

Satō

[11] Patent Number: 4,924,219

[45] Date of Patent: May 8, 1990

[54] RETRIEVAL APPARATUS USING LOGICAL OPERATORS

[75] Inventor: Masamitsu Satō, Tokyo, Japan

[73] Assignee: Kabushiki Kaisha Toshiba, Kawasaki, Japan

[21] Appl. No.: 80,308

[22] Filed: Jul. 31, 1987

[30] Foreign Application Priority Data

Aug. 13, 1986 [JP]  Japan .................. 61-190101

[51] Int. Cl.⁵ .............................................. G08B 5/22
[52] U.S. Cl. .................. 340/825.49; 364/419
[58] Field of Search ........ 364/403, 419, 900 MS File, 364/200 MS File; 340/825.49; 455/39

[56] References Cited

U.S. PATENT DOCUMENTS

| | | | |
|---|---|---|---|
| 4,476,469 | 10/1984 | Lander | 340/825.49 |
| 4,595,922 | 6/1986 | Cobb et al. | 340/825.49 |
| 4,636,950 | 1/1987 | Caswell et al. | 364/403 |
| 4,656,463 | 4/1987 | Anders et al. | 340/870.09 |
| 4,688,026 | 8/1987 | Scribner et al. | 340/572 |

FOREIGN PATENT DOCUMENTS

| | | |
|---|---|---|
| 54-9387 | 1/1979 | Japan . |
| 1295566 | 11/1972 | United Kingdom . |
| 1427920 | 3/1976 | United Kingdom . |
| 1500169 | 2/1978 | United Kingdom . |
| 1516740 | 7/1978 | United Kingdom . |
| 2016768 | 9/1979 | United Kingdom . |

OTHER PUBLICATIONS

Lexis Handbook, Media Data Central, Copyright 1980.
APS Text Search and Retrieval Reference Manual, Command Summary, Sept., 1986.

Primary Examiner—Jerry Smith
Assistant Examiner—David M. Huntley
Attorney, Agent, or Firm—Oblon, Spivak, McClelland, Maier & Neustadt

[57] ABSTRACT

A retrieval apparatus of this invention includes retrieval processing sections constituted by semiconductor IC elements attached to each of the objects to be retrieved, and an operation section for supplying a retrieval condition to these retrieval processing sections. In each retrieval processing section, retrieval item information of an object to be retrieved to which the individual section is attached is stored in a storage section, a retrieval condition signaled from the operation section is received and analyzed, the analysis result is collated with the information stored in the storage section, and if a coincidence is detected, signaling is performed by light or sound. The retrieval condition may be constituted using logical product, logical sum and logical negation operators.

16 Claims, 7 Drawing Sheets

RETRIEVAL APPARATUS USING LOGICAL OPERATORS

BACKGROUND OF THE INVENTION

The present invention relates to a retrieval apparatus for a library, for example.

It is difficult to retrieve an article as an object to be retrieved, e.g., a book from a library. In particular, as the number of books as objects to be retrieved is increased, or as retrieval conditions become complicated, retrieval is difficult to attain.

In order to solve the above problem, an attempt is made to constitute a database for objects to be retrieved using a computer system and to use it for article retrieval. For example, in a book management system, a book database is searched to obtain information indicating a particular book, e.g., a reference number of the book, and the book is extracted in accordance with this information.

However, in this system, two steps are required, that is, information for specifying a book (article) is obtained using the database, and the corresponding book (article) is located and extracted using the data. Creation of a large-scale database which can cover all the information of objects to be retrieved is not easy in consideration of the need for a computer system and the cost for preparing the database.

SUMMARY OF THE INVENTION

It is an object of the present invention to provide a retrieval apparatus which can directly locate an article as an object to be retrieved by a simple scanning operation.

In order to achieve the above object, a retrieval apparatus according to the present invention comprises: retrieval request generating means constituted by retrieval condition input means for inputting a condition for retrieving an object to be retrieved, and retrieval condition transmission means for transmitting the retrieval condition input from the retrieval condition input means; and retrieval request response means attached to individual objects to be retrieved, the retrieval request response means having retrieval condition reception means for receiving the retrieval condition transmitted from the retrieval condition transmission means, retrieval condition analyzing means for analyzing the retrieval condition received by the retrieval condition reception means, identification information storage means for storing identification information inherent to the objects to be retrieved, collation means for collating the analysis result from the analyzing means with the inherent identification information stored in the identification information storage means and outputting a coincidence signal if a coincidence is established therebetween, and signal means for signaling, in response to the coincidence signal from the collation means, that a requested object to be retrieved is present.

According to the present invention, if a retrieval processing section attached to an object to be retrieved has information coinciding with a retrieval condition supplied from a scanning section, this is signaled by light or sound. The object to be retrieved can be directly found with reference to the light or sound.

For example, an information processing section attached to a back surface of each book stocked on a book shelf selectively emits light, so that a book with information as an object to be retrieved is distinguished from other books, and can be easily and directly found. Therefore, unlike information retrieval utilizing a database, an article as an object to be retrieved can be easily and efficiently extracted.

DETAILED DESCRIPTION OF THE PREFERRED EMBODIMENTS

Figure 1:
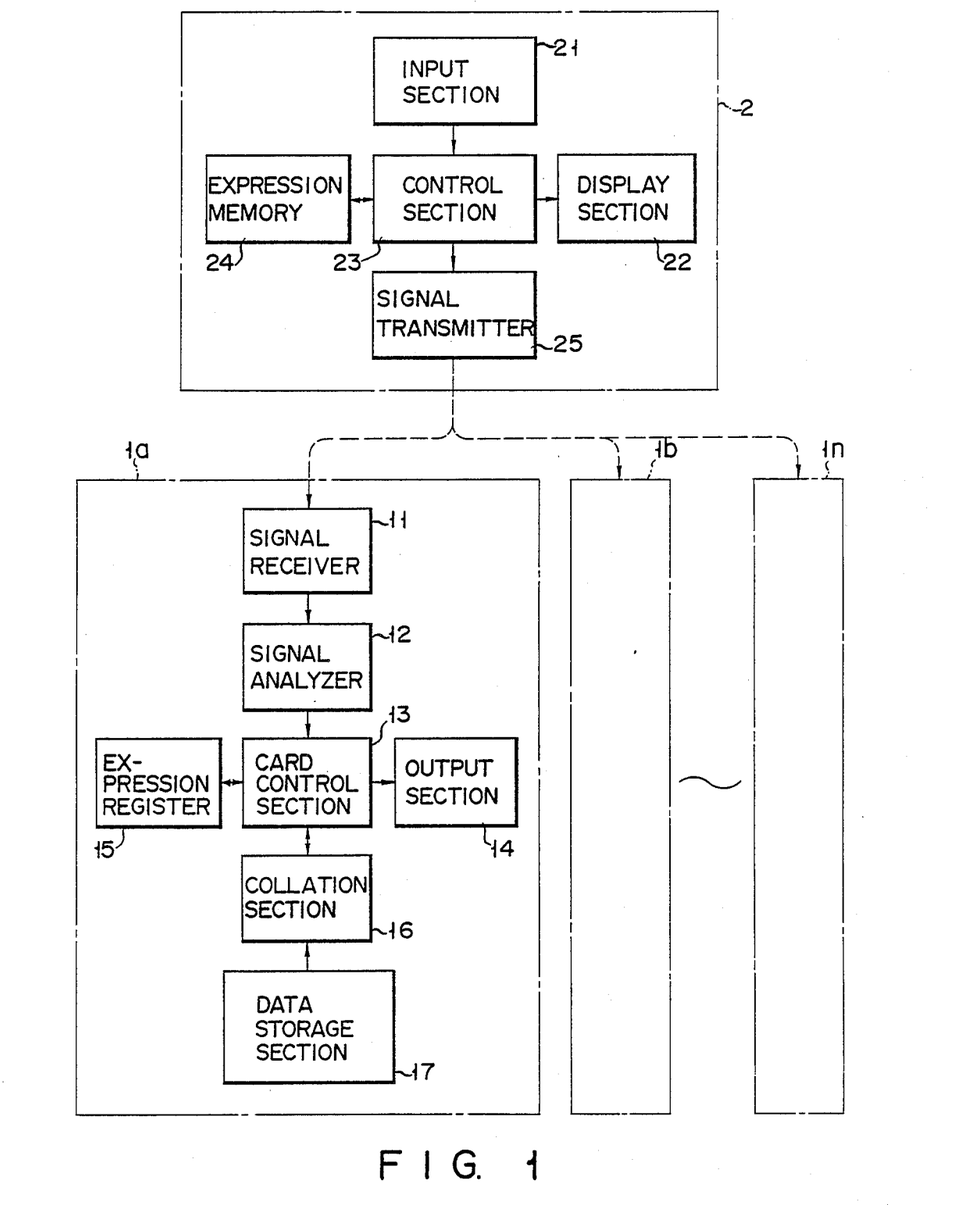
FIG. 1 is a block diagram showing a retrieval apparatus according to an embodiment of the present invention.

FIG. 1 is a block diagram showing a retrieval apparatus according to an embodiment of the present invention. The retrieval apparatus comprises retrieval processing sections 1a, 1b, . . . , 1n, and operation section 2 for receiving a retrieval condition and signaling it to retrieval processing sections 1a, 1b, . . . , 1n.

Figure 2:
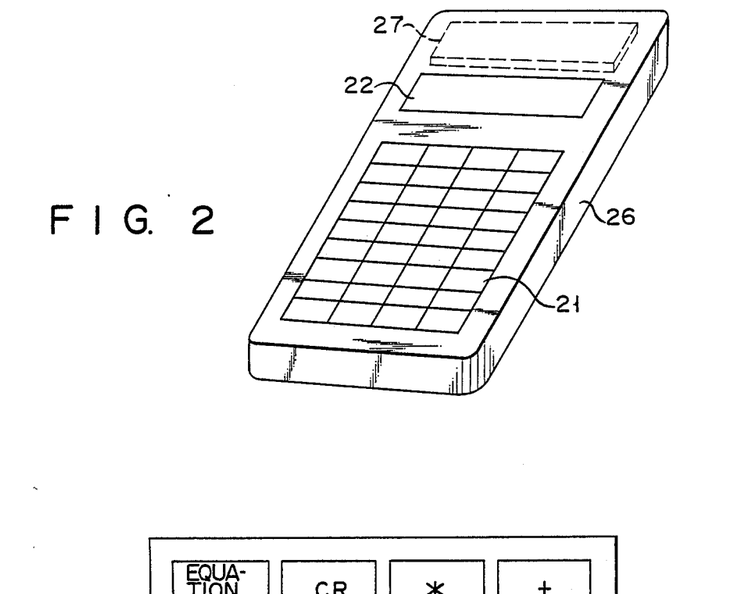
FIG. 2 is a view showing an outer appearance of an operation section shown in FIG. 1.
Figure 3:
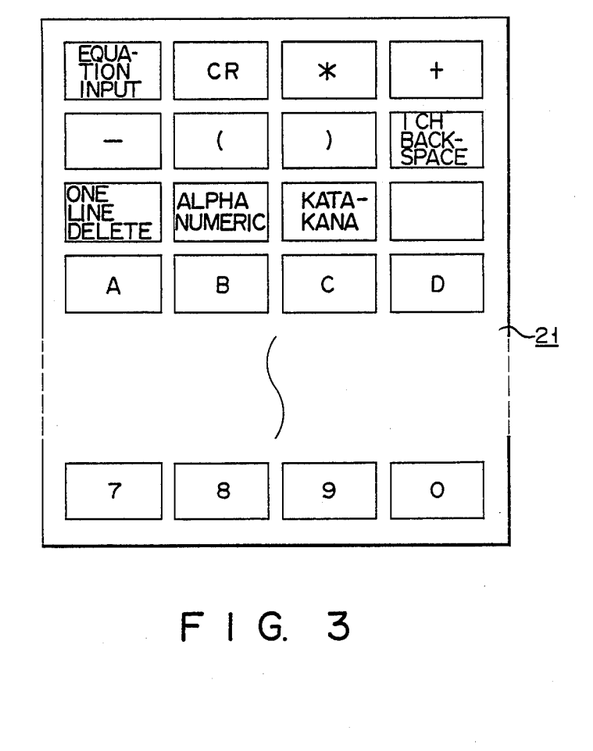
FIG. 3 is a view showing an arrangement of a keyboard on the operation section shown in FIG. 2.

Operation section 2 comprises input section 21 for inputting a retrieval condition, expression memory 24 for storing retrieval condition expressions input through input section 21, display section 22 for displaying the retrieval condition, signal transmitter 25 for transmitting the retrieval condition as a radio-wave signal, and control section 23 for controlling input section 21, expression memory 24, display section 22, and signal transmitter 25. Operation section 2 incorporates input section 21, display section 22, and semiconductor integrated circuit (IC) element 27 in casing 26 of a size about the same as a pocket notebook, as shown in FIG. 2. Semiconductor IC element 27 is constituted by integrating control section 23, expression memory 24, and signal transmitter 25 on a single chip. Keyboard 21 comprises letter keys, numeric keys, and keys representing logical operations, and function keys including a one line delete key, an alphanumeric key, a katakana key, a 1-CH backspace key, an expression input key, and a carriage return key, as shown in FIG. 3. These keys are operated to input a retrieval condition expression. The input retrieval condition expression is displayed on display section 22 under the control of control section 23. The expression input key instructs input start of the retrieval condition expression. After the expression input key, a key word for specifying an object to be retrieved is input as a retrieval condition using the letter and numeric keys. Then, the carriage return key is depressed to instruct an end of retrieval condition expression input. The retrieval condition expression is constituted by a plurality of retrieval conditions (e.g., key words) by appropriately operating a "*" key indicating a logical product of retrieval conditions, a "+" key indicating a logical sum of retrieval conditions, a "−" key indicating a logical negation of a retrieval condition, and keys indicating brackets.

When control section 23 detects that the key input from input section 21 is the expression input key, it sequentially stores the following retrieval condition expressions in expression memory 24. When section 23 detects the depression of the carriage return key, it supplies the retrieval condition expressions stored in expression memory 24 to signal transmitter 25. As a result, signal transmitter 25 converts the retrieval condition expressions into a radio-wave signal, and transmits it. The retrieval condition expressions transmitted from signal transmitter 25 are signaled to retrieval processing sections 1a, 1b, ..., 1n.

Figure 4:
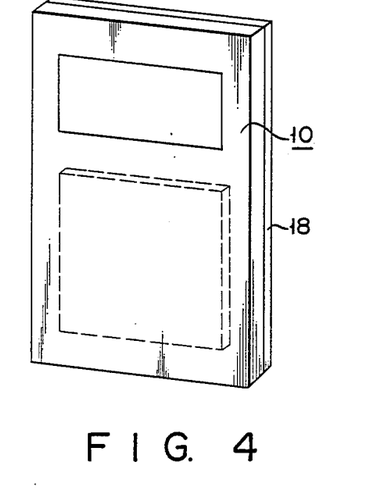
FIG. 4 is a view showing a shape of a retrieval processing section shown in FIG. 1.
Figure 5:
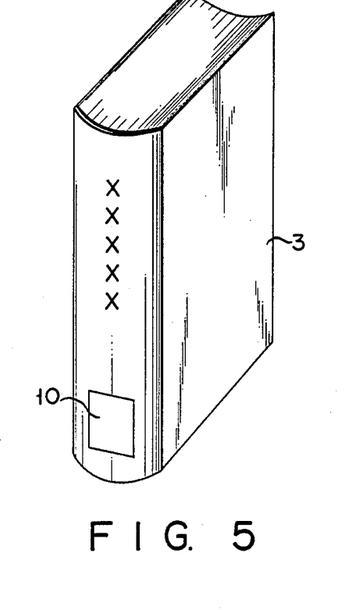
FIG. 5 is a view showing a case wherein the retrieval processing section is attached to a book.
Figure 6:
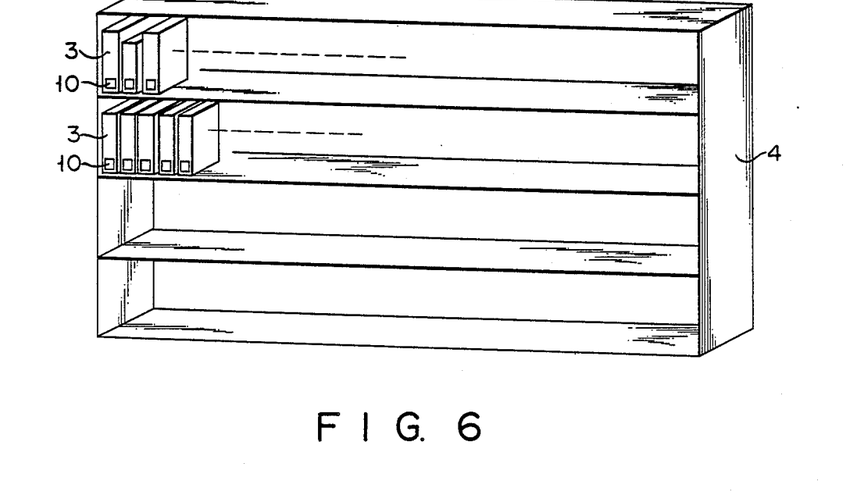
FIG. 6 is a schematic view showing an arrangement of the retrieval processing section.

As shown in FIG. 1, each of retrieval processing sections 1a, 1b, ..., 1n comprises signal receiver 11 for receiving the retrieval condition expressions transmitted from signal transmitter 25, signal analyzer 12 for analyzing the retrieval condition expression supplied from signal receiver 11, expression register 15 for storing the retrieval condition expression analyzed by signal analyzer 12, data storage section 17 prestoring key word and the like indicating labels of various information written on books to which retrieval processing sections 1a, 1b, ..., 1n are attached as information of items of objects to be retrieved, collation section 16 for collating the retrieval condition expression stored in register 15 with retrieval item information stored in data storage section 17, output section 14 comprising a display element such as a light emitting diode for outputting the collation result, and card control section 13 for controlling signal receiver 11, signal analyzer 12, expression register 15, output section 14, collation section 16, and data storage section 17. Each of retrieval processing sections 1a, 1b, ..., 1n is arranged as very small IC card 10, as shown in FIG. 4. In IC card 10, function blocks, i.e., signal receiver 11, signal analyzer 12, expression register 16, collation section 16, data storage section 17, and card control section 13, are integrated on a single chip and the chip is incorporated in a card-like casing. The light emitting diode as output section 14 is arranged on the surface of the casing. Attaching portion 18 is provided on the rear surface of the casing. IC card 10 is attached to the back surface of each book 3 by attaching portion 18, as shown in FIG. 5. More specifically, retrieval processing sections 1a, 1b, ..., 1n each comprising IC card 10 are respectively attached to a plurality of books 3 stocked on book shelf 4, as shown in FIG. 6.

The retrieval condition expression information is transmitted, through a radio wave, to a plurality of retrieval processing sections 1a, 1b, ..., 1n which are provided as described above, and is simultaneously signaled thereto.

Note that IC cards 10 constituting retrieval processing sections 1a, 1b, ..., 1n can be incorporated in the back surfaces of books 3. In this case, IC card 10 is incorporated in an article as an object to be retrieved so that the light emitting diode (output section 14) is exposed therefrom.

Signal analyzer 12 checks the frequency of the received signal to check if the input signal is supplied from operation section 2. If the input signal is not supplied from operation section 2, no signal analysis is performed. Collation section 16 collates retrieval item information stored in data storage section 17, and the retrieval condition expression stored in expression register 15, and signals the collation result to card control section 13. When card control section 13 receives the collation result indicating that a coincidence with the retrieval condition is found, it energizes output section 14 to emit light. Note that an output indication can also be performed by sound.

When retrieval item information coinciding with the retrieval condition signaled from operation section 2 is stored in intra data storage section 17, each of retrieval processing sections 1a, 1b, ..., 1n externally signals the coincidence result via output section 14. Upon this signaling, book 3 which coincides with the retrieval condition expression input from operation section 2 can be directly found.

Collation processing between a signaled retrieval condition expression and retrieval item information stored in data storage section 17 will now be described.

The retrieval condition expression is given in the form of a key word representing an item of an object to be retrieved, and its logical combination. More specifically, A and B are respectively key words, a logical operator "*" is defined as a logical product (AND), an operator "+" is defined as a logical sum (OR), and an operator "−" is defined as a logical negation (NOT). Five fundamental retrieval condition expressions are as follows:

(i) A : A is present
(ii) A*B : Both A and B are present
(iii) A+B : Either A or B is present
(iv) A−B : A is present but B is absent
(v) −A : A is absent The above five fundamental retrieval condition expressions are given in brackets "(,)" indicating the priority order of the operation. The priority order of the operators is defined as, e.g., (,) > − > * > +. That is, the brackets have the highest priority order, and the logical sum has the lowest priority order.

Figure 8A:
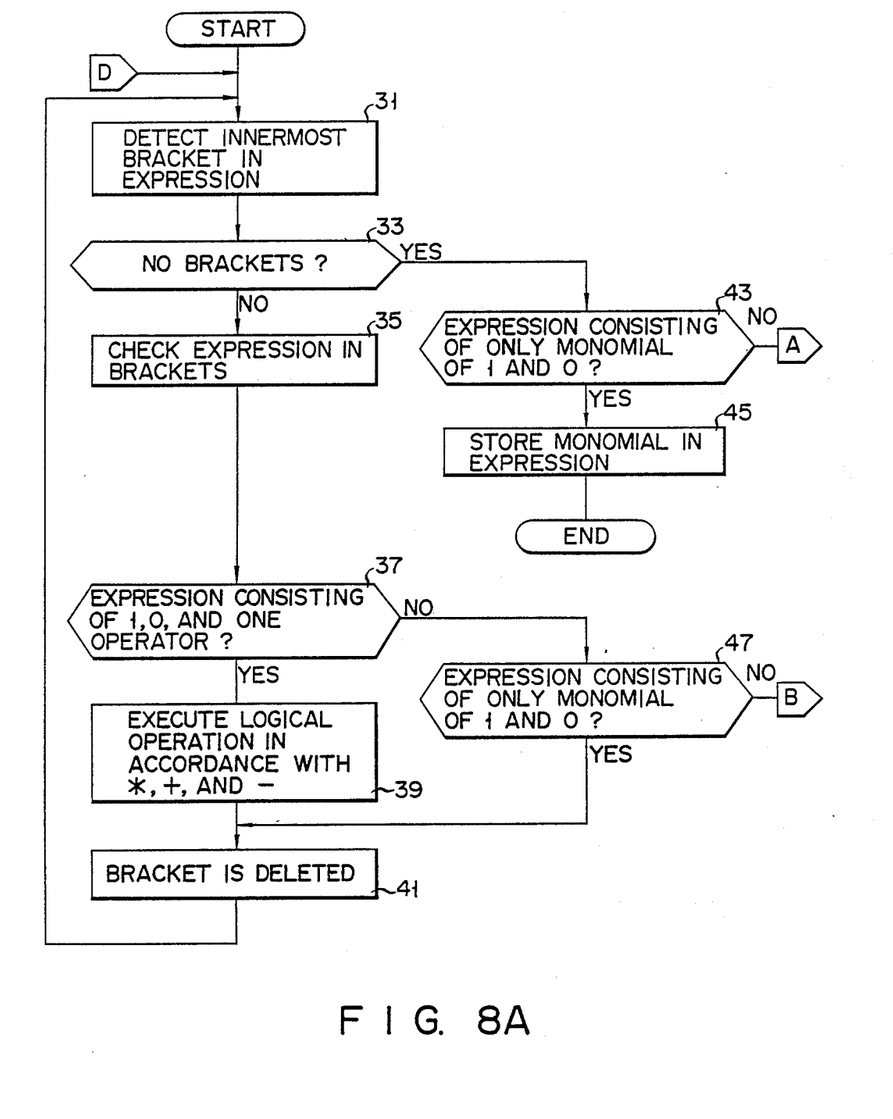
FIGS. 8A through 8C are flow charts showing retrieval condition analysis processing.
Figure 8B:
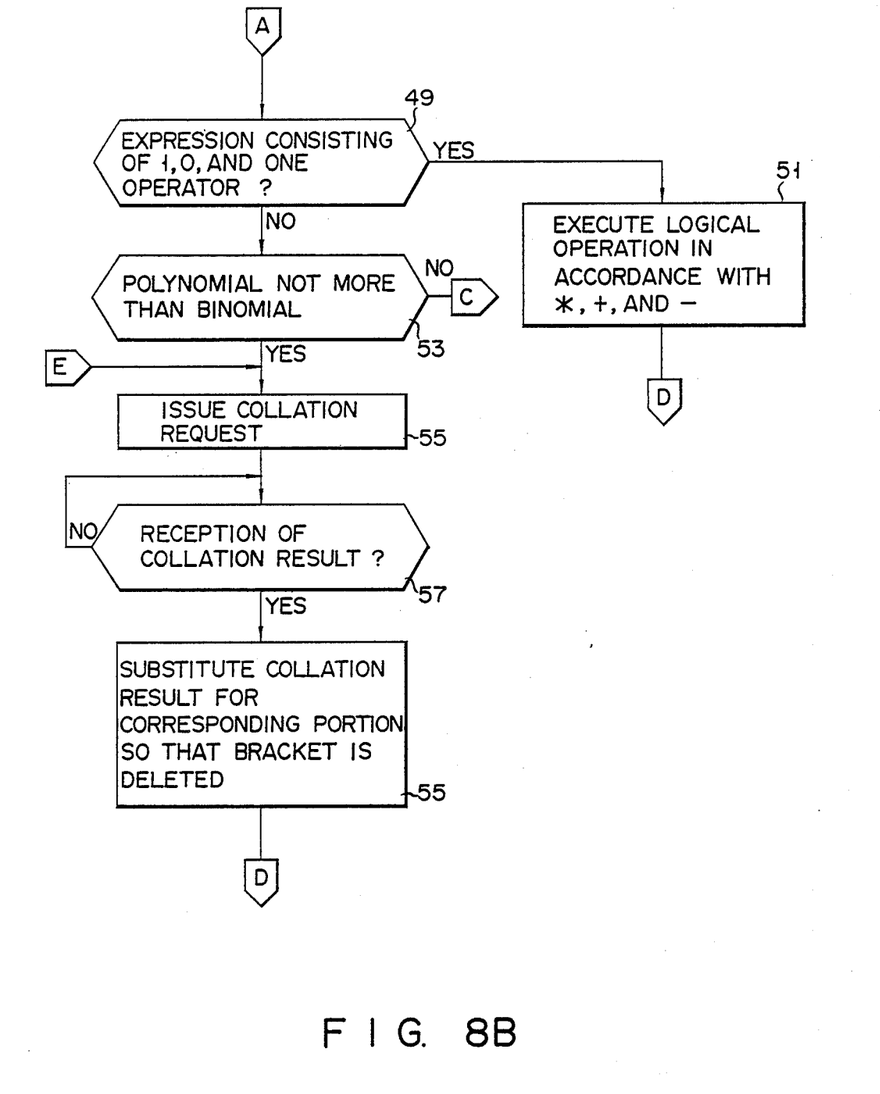
Figure 8C:
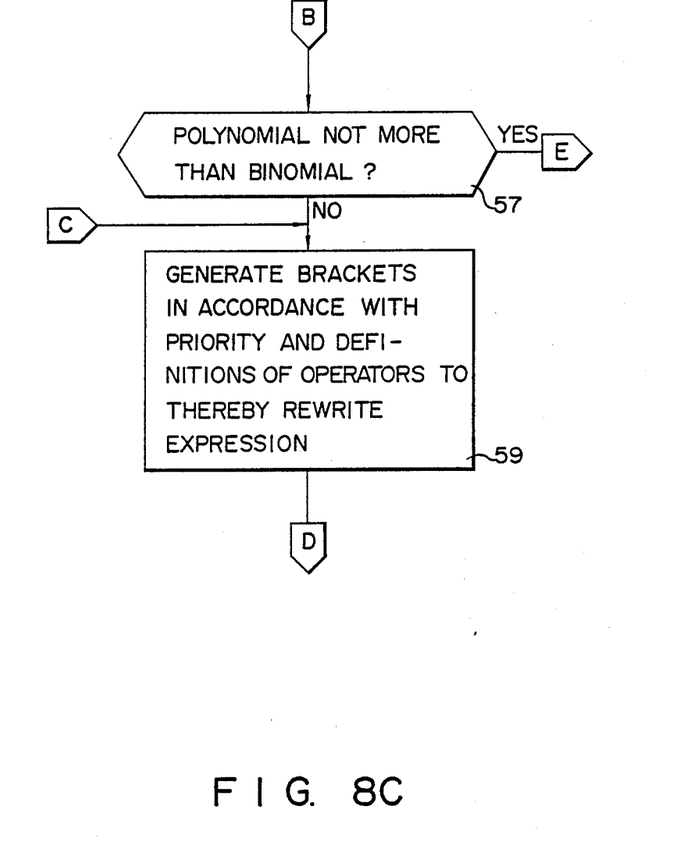

The collation processing will now be described with reference to the flow charts shown in FIGS. 8A through 8C.

In step 31, brackets, in particular, the innermost brackets in the retrieval condition expression, are detected. If it is determined in step 33 that the brackets are present, the condition expression in the brackets is checked in step 35. It is checked in step 37 if the expression consists of "1", "0", and one operator. If YES in step 37, the logical operation is executed in accordance with the operators "*", "+", and "−" in step 39. In step 41, the brackets are removed, and the flow returns to step 31. On the other hand, if NO in step 37, i.e., it is determined that the expression does not consist of only "1", "0", and one operator, it is checked in step 47 if the expression consists of only a monomial of "1" and "0". If YES in step 47, the flow advances to step 41. However, if NO in step 47, the flow advances to step 57 in FIG. 8C to check if the expression is a polynomial not more than a binomial. If NO in step 57, brackets are generated in accordance with the priority of the operators and algorithm, thereby rewriting the expression. Then, the flow returns to step 31. On the other hand, if YES in step 33, i.e., if it is determined that no brackets are present, it is checked in step 43 if the expression consists of only a monomial of "1" and "0". If YES in step 43, the monomial is stored in expression register 15. However, if NO in step 43, the flow advances to step 49 to check if the expression consists of "1", "0", and one operator. If YES in step 49, the flow advances to step 51, and the logical operation in accordance with the operators "*", "+", and "−" is executed. The flow then returns to step 31. However, if NO in step 49, the flow advances to step 53 to check if the expression is a polynomial not more than binomial. If NO in step 53, the flow advances to step 59. However, if YES in step 53, a collation request is issued in step 55. If it is determined in step 57 that the collation request is received, the collation result is substituted for the corresponding portion and the brackets are removed in step 55. The flow then returns to step 31.

On the contrary, if NO in step 57, the flow advances to step 59. In step 59, brackets are generated in accordance with priorities and definitions of operators so that the expressions are rewritten.

The algorithm of the collation processing shown in FIGS. 8A through 8C can be summarized as follows:

(I) Brackets in a retrieval condition expression are checked to obtain innermost brackets.

(II) A collation request is issued for the expression inside the brackets.

(III) If the collation result is affirmative, "1" is set, and if it is negative, "0" is set.

(IV) "1" or "0" is substituted for the corresponding portion of the original expression, and the brackets are removed.

(V) When the expression inside the brackets consists of only "1", "0" and an operator, the logical operation is executed in accordance with the operator and its algorithm, thereby removing the brackets.

(VI) For the polynomial without brackets, brackets are generated in accordance with the priority order of the operators, and the logical operations are sequentially executed.

(VII) For a term consisting of only "1" or "0", no collation request is issued.

(VIII) Steps (I) through (VIII) are repeated until all the brackets disappear and all the key words are converted to "1" or "0".

More specifically, the collation processing is executed from the expression inside the innermost brackets of those included in the given retrieval condition expression to sequentially obtain the collation results. Then, the logical operation result of the collation results is obtained. In this manner, the retrieval collation processing is executed.

Figure 7:
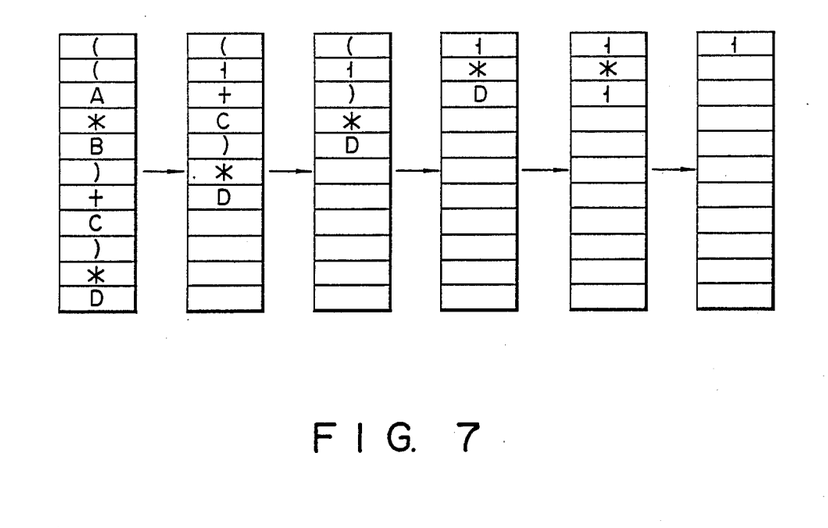
FIG. 7 is a view showing analyses of retrieval condition expressions.

More specifically, assuming that a retrieval condition expression ((A*B)+C)*D is given, as shown in FIG. 7, the retrieval condition expression (A*B) inside the double brackets is first considered. If a collation result "1" is obtained for (A*B), the corresponding portion is rewritten with this value, and the corresponding brackets are removed. As a result, the retrieval condition expression is (1+C)*D. Then, collation of 1+C inside the brackets is performed. If a coincidence is established as a result of collation, 1+C is written as "1". As a result, the condition expression is (1)*D→1*D. Furthermore, the collation processing is performed, and finally, 1*1→1. As a result, a coincidence is established for the retrieval condition.

When the coincidence is determined with the abovementioned collation processing, output section 14 is energized to emit light or produce sound, thereby signaling that book 3 to which the corresponding one of retrieval processing section 1a, 1b, . . . , 1n is attached is an article as an object to be retrieved.

Figure 9:
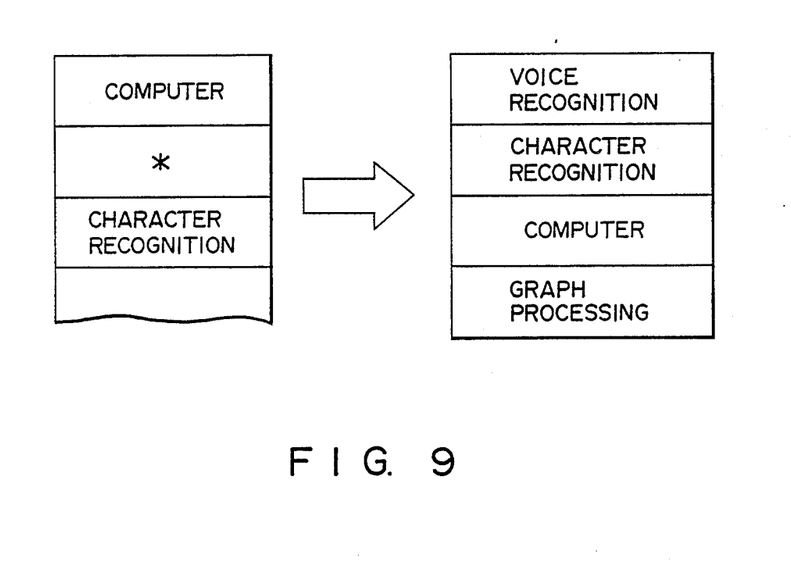
FIG. 9 is a view showing retrieval item information stored in a data storage section which is retrieved and is collated with an input retrieval condition expression.

More specifically, for example, if the condition expression (computer)*(character recognition) is input as shown in FIG. 9, each of retrieval processing sections 1a, 1b, . . . , 1n attached to a plurality of books 3 retrieves and collates if intra data storage section 17 stores (computer) and (character recognition). As shown in FIG. 9, if intra data storage section 17 in which retrieval item information (voice recognition), (character recognition), (computer), and (graphic processing) are registered is detected, a coincidence with the retrieval condition is detected.

According to the retrieval apparatus of the present invention, when the retrieval condition expression is input from operation section 2 and is signaled to a plurality of retrieval processing sections 1a, 1b, . . . , 1n, individual sections 1a, 1b, . . . , 1n check if the retrieval item information corresponding to the retrieval condition expression is registered in intra data storage section 17. When the coincidence result for the collation condition is obtained, this is signaled by light or sound. An operator who operates operation section 2 can directly retrieve and extract an article to be retrieved, e.g., book 3, with reference to this signaling. For example, if a book describing desired information is to be retrieved from a large number of books stocked on the book shelf, the corresponding book can be easily and directly found since one of retrieval processing sections 1a, 1b, . . . , 1n attached to the back surface of the corresponding book emits light.

Therefore, no cumbersome operation is required unlike in the conventional apparatus wherein a database is temporarily retrieved to obtain a reference number of an object to be retrieved, and thereafter, an article as the object to be retrieved is extracted with reference to the reference number. In addition, since no database is constituted, cost advantages can also be provided.

The present invention is not limited to the above embodiment. For example, operation section 2 can have a correction function for an input retrieval condition expression. The syntax and its analysis algorithm of the retrieval condition expression can be modified in accordance with applications of the apparatus.

Retrieval processing section 1 attached to each individual article to be retrieved is not limited to IC card 10. For example, the section can be a retrieval processing circuit having a shape allowing attachment to various articles to be retrieved. As a power source for the retrieval processing circuit, a film-like cell using a polymer film can be used. Alternatively, a photocell can be embedded. Furthermore, signaling of the coincidence result for the retrieval condition can be performed by flickering of the light emitting diode. Alternatively, if the signaling is made by a combination of light and sound as described above, it can be easily detected from a distant location. Thus, the retrieval operation can be further facilitated. Moreover, the signaling time can be limited, and after a predetermined period of time has passed, the retrieval processing circuit can be automatically initialized. Alternatively, the circuit can be initialized upon input of the next retrieval condition expression.

What is claimed is:

1. A hand-held book retrieval apparatus for use in a library, comprising:
retrieval request generating means including:
retrieval condition generating means for inputting a condition including at least logical product, logical sum, and logical negation for retrieving an object requested to be retrieved;

retrieval condition transmission means for transmitting the retrieval condition input from said retrieval condition generating means; and retrieval request response means individually attached to a plurality of objects to be retrieved, and including:

retrieval condition reception means for receiving the retrieval condition including at least logical product, logical sum, and logical negation transmitted from the retrieval condition transmission means;

retrieval condition analyzing means, including means for performing at least any of the logical product, logical sum, and logical negation, for analyzing the retrieval condition received by said retrieval condition reception means;

identification information storage means for storing identification information inherent to the objects to be retrieved;

collating means for collating the analysis result from said analyzing means with the inherent identification information stored in said identification information stored means and outputting a coincidence signal when a coincidence is detected; and signaling means for signaling, in response to the coincidence signal from said collation means, that the object requested to be retrieved is present.

2. An apparatus according to claim 1, wherein said retrieval request response means comprises an integrated circuit (IC) element and is attached to or incorporated in an object to be retrieved.

3. An apparatus according to claim 1, wherein said signaling means comprises a light emitting element.

4. An apparatus according to claim 1, wherein said retrieval condition generating means comprises a keyboard, said keyboard having alphanumeric keys, a key indicating a logical product of retrieval conditions, a key indicating a logical sum of retrieval conditions, a key indicating a logical negation of a retrieval condition, and keys indicating brackets.

5. An apparatus according to claim 4, wherein an operation of data inside the brackets has the highest priority order, followed by the logical negation, the logical product, and the logical sum.

6. An apparatus according to claim 1, wherein the retrieval condition is expressed by a monomial or polynomial.

7. A hand-held retrieval apparatus, comprising:
retrieval request generating means including:
retrieval condition input means for inputting a condition including at least logical product, logical sum, and logical negation for retrieving an object to be retrieved, the retrieval condition comprising a plurality of retrieval data input from said retrieval condition input means;

retrieval condition transmission means for transmitting the retrieval condition input from said retrieval condition input means; and retrieval request response means individually attached to a plurality of objects to be retrieved, and including:

retrieval condition reception means for receiving the retrieval condition, including at least logical product, logical sum, and logical negation, transmitted from the retrieval condition transmission means;

retrieval condition analyzing means, including means for performing at least any of logical product, logical sum, and logical negation, for analyzing the retrieval condition received by said retrieval condition reception means and for outputting analysis result;

identification information storage means for storing identification information inherent to the objects to be retrieved;

collation means for collating the analysis result from said retrieval condition analyzing means with the inherent identification information stored in said identification information storage means and outputting a coincidence signal when a coincidence is detected, and signaling means for signaling, in response to the coincidence signal from said collation means, that the object requested to be retrieved is present.

8. An apparatus according to claim 7, wherein said signaling means comprises a light-emitting element.

9. An apparatus according to claim 7, wherein said retrieval condition input means comprises a keyboard, said keyboard having alphanumeric keys, a key indicating a logical product of retrieval conditions, a key indicating a logical sum of retrieval conditions, a key indicating a logical negation of a retrieval condition, and keys indicating brackets.

10. An apparatus according to claim 9, wherein an operation of data inside the brackets has the highest priority order, followed by the logical negation, the logical product, and the logical sum.

11. An apparatus according to claim 10, wherein the retrieval condition is expressed by a monomial or polynomial.

12. A hand-held book retrieval apparatus for use in a library, comprising:
retrieval request generating means including retrieval condition input means for inputting a condition including at least logical product, logical sum, and logical negation, for retrieving an object requested to be retrieved;

retrieval condition transmission means for transmitting the retrieval condition input from said retrieval condition input means; and retrieval request response means individually attached to a plurality of objects to be retrieved, and including:

retrieval condition reception means for receiving the retrieval condition including at least logical product, logical sum, and logical negation transmitted from the retrieval condition transmission means;

identification information storage means comprising a large scale-integration semiconductor device, for storing identification information inherent to the objects to be retrieved;

means for performing at least any of logical product, logical sum, and logical negation;

analyzing means for analyzing the retrieval condition received by said retrieval condition reception means to produce analysis result;

collating means for collating the analysis result with the inherent identification information stored in said identification information storage means;

output means for outputting a coincidence signal when a coincidence is detected; and signaling means for signaling, in response to the coincidence signal from said output means that the output requested to be retrieved is present.

13. An apparatus according to claim 12, wherein said signaling means comprises a light emitting element.

14. An apparatus according to claim 12, wherein said retrieval condition input means comprises a keyboard, said keyboard having alphanumeric keys, a key indicating a logical product of retrieval conditions, a key indicating a logical sum of retrieval conditions, a key indicating a logical negation of a retrieval condition, and keys indicating brackets.

15. An apparatus according to claim 14, wherein an operation of data inside the brackets has the highest priority order, followed by the logical negation, the logical product, and the logical sum.

16. An apparatus according to claim 15, wherein the retrieval condition is expressed by a monomial or polynomial.

* * * * *